Nov. 19, 1968     J. T. BOATWRIGHT ET AL     3,412,331
RANDOM SAMPLING VOLTMETER
Filed April 29, 1965
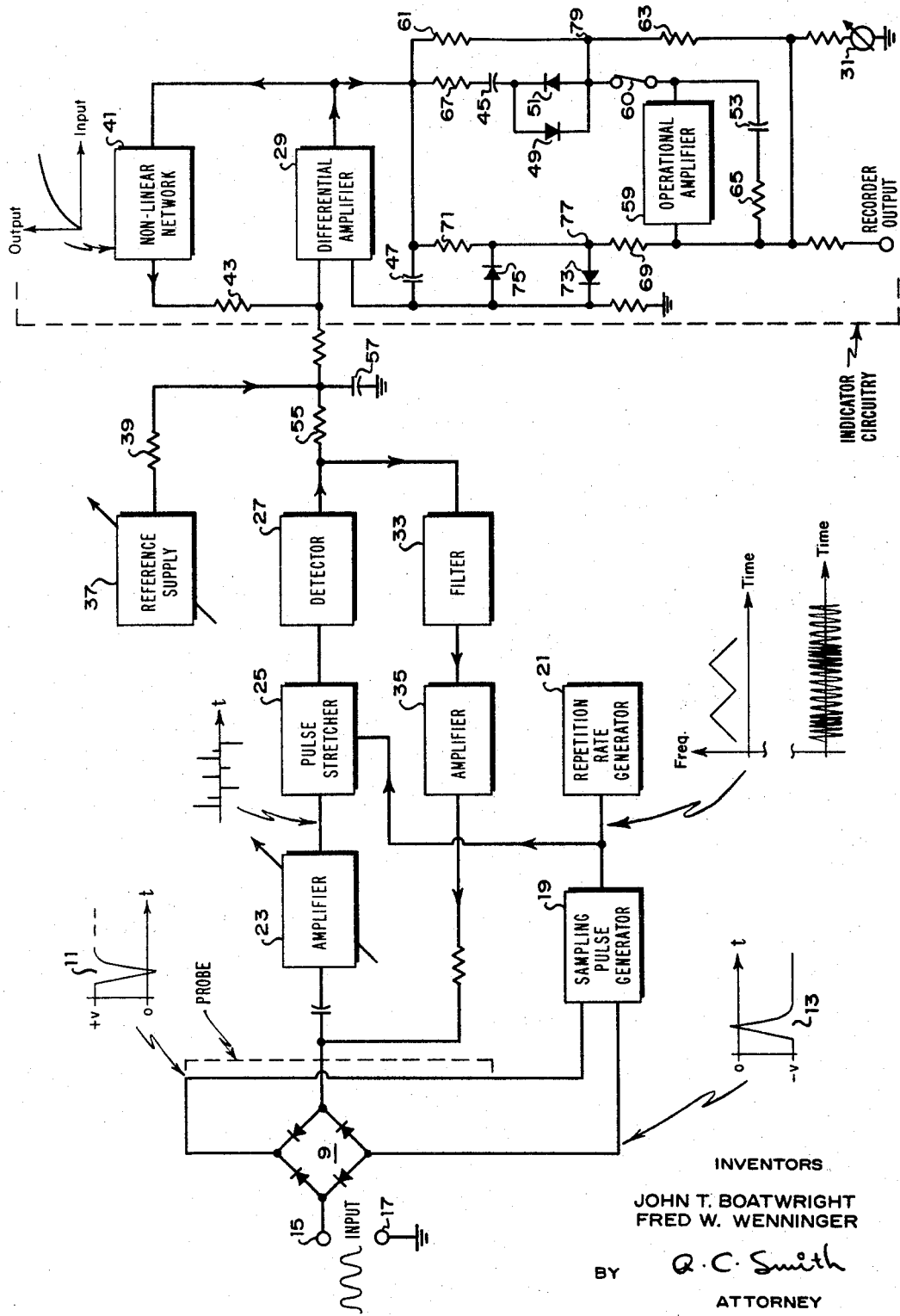
INVENTORS
JOHN T. BOATWRIGHT
FRED W. WENNINGER
BY *Q. C. Smith*
ATTORNEY

United States Patent Office 3,412,331
Patented Nov. 19, 1968

3,412,331
RANDOM SAMPLING VOLTMETER
John T. Boatwright, Loveland, and Fred W. Wenninger, Garfield, Colo., assignors to Hewlett-Packard Company, Palo Alto, Calif., a corporation of California
Filed Apr. 29, 1965, Ser. No. 451,848
2 Claims. (Cl. 324—120)

ABSTRACT OF THE DISCLOSURE

A voltmeter circuit samples an applied high frequency signal at dissimilar successive intervals and detects a selected parameter of the samples of random amplitudes to produce an indication of the corresponding parameter of the applied signal.

---

This invention relates to a high frequency sampling voltmeter in which the repetition rate of the sampling pulses varies with time for asynchronous operation of the voltmeter on applied signals. The statistical distribution of samples of the applied signal obtained in this manner over a long period of time can be shown to be identical to the statistical distribution of samples of the applied signal obtained in synchronized delayed-time increments. The RMS or average or peak value of a large number of samples of the applied signal obtained in an aynchronous manner thus provides an indication of the corresponding measurement value of the applied signal itself.

Accordingly, it is an object of the present invention to provide an improved wideband high frequency voltmeter.

It is another object of the present invention to provide a sampling-type voltmeter which obviates the need for applied signal synchronizing circuitry.

In accordance with the illustrated embodiment of the present invention, samples are taken of the applied signal at a rate which varies with time. The samples are stored or stretched between sampling intervals and the stretched sample pulses are detected to provide an indication of the average, peak, RMS, etc. value of the applied signal, independent of its waveform or frequency. An indication due to self-generated or random noise in the system is effectively reduced by extracting a D.C. signal having an amplitude which is equivalent to the statistical sampling of such noise.

These and other objects of the present invention will be apparent from a reading of this specification and an inspection of the accompanying drawing which shows a circuit diagram of the sampling voltmeter.

General description

Referring now to the drawing, there is shown a normally non-conductive diode bridge sampler 9 which simultaneously receives substantially similar signals 11 and 13 of opposite polarity on one set of diagonal terminals. Signal appearing at input terminals 15 and 17 is applied to terminal 16 along one branch circuit of the bridge 9. The sampling signals are produced by sampling pulse generator 19 at a varying rate related to the frequency-modulated signal from the repetition rate generator 21. In practice, the sampling pulses appear at a repetition rate which varies from about 10 kilocycles to about 20 or 30 kilocycles at a 10 cycle per second rate. The 10 cycle per second variation rate is chosen above the response of meter 31 to prevent undesirable jitter. Each time the sampling signals 11 and 13 are applied to the sampler 9, it is rendered conductive momentarily to produce a sample pulse of the applied signal. These sample pulses are amplified by amplifier 23 and are applied to the pulse stretcher 25 which receives a signal from generator 21 each time sampler 9 is rendered conductive and holds the peak amplitude of a sample pulse until the next sample pulse appears. The output of pulse stretcher 25 is detected by a suitable detector 27 which produces a D.C. output related to the peak, average, RMS, etc. value of the stretcher output. This D.C. signal, which is related to the corresponding peak, average, RMS, etc. value of the signal applied to the input, independent of its frequency or its waveform, is applied to the indicator circuitry which includes a meter 31. The gain of amplifier 23 may be varied in steps to provide selected ranges of measurement sensitivity. Any thermal drift voltages in the sampler 9 or unbalance in the sampling signals 11 and 13 results in a D.C. offset at the output of detector 27 in the absence of an applied signal. This offset error signal is fed back through low pass filter 33 and amplifier 35 to the sampler 9 to alter the bias on the diodes of sampler 9, thereby to restore balance.

Noise suppression

On the lower ranges (i.e. greater signal sensitivity), noise of the system may contribute as much as 20% of the detector output signal. This residual noise signal is substantially independent of the source impedance across which a signal is being measured because of the extremely low conduction to non-conduction time ratio of the sampler 9 which results in almost total isolation of the system from a signal source connected to the input terminals 15, 17. Thus, this residual noise signal can be reduced by a quantity that is fixed for all operating conditions of the system to provide a zero indication on indicator meter 31 in the absence of an applied signal. Reference supply 37 is adjusted to supply a D.C. signal through resistor 39 which bucks out the D.C. equivalent of the random noise in the system to provide a zero indication on indicator meter 31 in the absence of applied signal. The measurement accuracy at low levels is thus preserved while at higher signal levels, where the noise constitutes a less significant portion of the total detector output, the noise suppression circuitry does not significantly affect the accuracy of the measurement indication on indicator meter 31.

Indicator circuitry

The output of detector 27 is related to the combination of noise power and the signal power (which, because of the random nature of the stretched sample pulses, can be considered to be like noise power for purposes of analysis). Thus, the output of the detector 27 is non-linearly related to the amplitude of the input signal, independent of whether the detector 27 responds to the peak, average, RMS, etc., value of the stretched sample pulses (see W. R. Bennett; Response of a Linear Rectifier to Signal and Noise; Bell System Technical Journal; January 1944). Non-linear network 41, which has a transfer characteristic substantially as shown on the drawing, is connected through resistor 43 in a negative feedback path from the output to the input of differential amplifier 29. This decreases the gain at large signal level and increases the gain at low signal levels in inverse relationship to the transfer characteristic of the detector 27, thereby maintaining the signal gain constant to the output of amplifier 29 for all levels of signal and noise input to the detector 27. This provides an output for driving the indicator meter 31 linearly with applied signal amplitude.

The signal applied to the indicator meter 31 is damped to provide a steady indication of the applied signal. A selected amount of linear damping is required to prevent jitter in the meter indication caused, for example, by sample pulses produced at a slow repetition rate. In practice, as much as 1 percent jitter in the meter indication may result in the absence of damping when sample pulses of a large signal are produced at the 10 kilocycle rate. Also, the linear damping is required to prevent instantaneous noise spikes from disabling the non-linear damping circuit, described below, which provides additional meter damping as a function of the amplitude of the signal change. This linear damping is provided by resistor 55 and capacitor 57 which form a low pass filter and by capacitor 47 connected in a feedback circuit around amplifier 29. The damped signal at the output of amplifier 29 is applied to meter 31 through the normally closed switch 60 and operational amplifier 59. For small changes in signal not sufficiently large to forward bias either of the diodes 49 or 51, the gain of this operational stage is unity, as determined by the equal-value resistors 61 and 63. Capacitor 53, connected as an integrator in a feedback circuit around amplifier 59 thus introduces additional damping to insure steady indications on meter 31.

For large signal excursions, one of the diodes 49 and 51 is rendered conductive, thus introducing a lead network including capacitor 45 which overcomes the damping effect of capacitor 53 (i.e., the pole introduced by $C_{53}$ is canceled by the zero introduced by $C_{45}$). This has the effect of eliminating meter damping during a large change in applied signal so that the meter may respond freely to the change. As the amplitude of the signal change decreases, the diodes 49 and 51 both become non-conductive and a high degree of meter damping is restored. Resistors 65 and 67 are provided to limit the maximum current required to be supplied by amplifier 59. Since resistors 61 and 63 are equal, capacitors 45 and 53 are made equal for the pole-zero cancellation mentioned above.

*Meter indication storage*

Switch 60 may be contacts of a relay which is actuated by a switch on the probe. The relay switch 60 opens the input to amplifier 59 so that the meter indication is held while the switch in the probe is depressed. Resistors 69 and 71 are equal to the resistors 63 and 61 so that both junctions 77 and 79 are nodal points at zero volts due to the operational feedback around amplifier 59. If the output of amplifier 29 varies due to changes in applied signal while switch 60 is open then the voltage on junction 77 also varies. When this voltage attains a value sufficient to forward bias either diode 73 or 75, a correction signal is applied to amplifier 29 to insure that its output does not vary any further.

Therefore, the voltmeter circuit of the present invention produces an output signal related to the statistical distribution of sample pulse taken of an applied signal in an asynchronous manner. This output signal drives an indicating meter linearly with a selected parameter of the applied signal. Also, meter damping according to the present invention varies with the rate of change of the applied signal to enhance the meter response. Further, the present invention eliminates the effect of system noise on the meter indication without affecting the measurement accuracy of the system.

We claim:
1. Signalling apparatus for operation on an applied signal comprising:
 a sampler responsive to a sampling control signal for producing a sample pulse from an applied signal having an amplitude related to the amplitude of the applied signal at the time of appearance of the sampling control signal;
 a source of sampling control signals connected to said sampler for applying sampling control signals thereto at a repetition rate which is frequency modulated;
 a signal detector responsive to the amplitudes of sample pulses for producing a direct current output signal related to the average value of the sample pulses;
 a source of unidirectional signal;
 a network connected to receive the output signal and said unidirectional signal for reducing the amplitude of the output signal by a value equal to the direct current equivalent of the average value of noise in the signalling apparatus;
 a differential amplifier having a pair of inputs and an output and having one input connected to receive the output signal;
 a nonlinear network connected in a feedback path from the output to said one input of the differential amplifier for producing an output which is linearly related to the applied signal;
 an output stage;
 means including a switch connected to apply the output of the differential amplifier to the input of said output stage; and
 a signal feedback path connected from the output to the input of said output stage and including a storage element for maintaining the signal at the input of said output stage substantially constant during a period of nonconduction of said switch, whereby the signal at the output of said output stage remains constant during the time said switch is non-conductive and at a value related to the applied signal at the instant said switch became nonconductive.

2. Signalling apparatus as in claim 1 comprising.
 a signal divider connected between the output of said output stage and the output of said differential amplifier;
 a pair of oppositely-poled shunt-connected diodes connected between a point on the signal divider and the other input of said differential amplifier for introducing a drift-correcting signal during a period of nonconduction of said switch in response to the signal at said point on the signal divider attaining an amplitude sufficient to forward bias one of said diodes; and
 indicator means connected to the output of said output stage for providing an indication of the amplitude of an applied signal.

References Cited

UNITED STATES PATENTS

| 2,356,617 | 9/1944 | Rich | 324—111 |
| 2,362,898 | 11/1944 | Gilman | 332—41 XR |
| 2,459,104 | 1/1949 | Gilbert | 324—118 XR |
| 2,459,730 | 1/1949 | Williams | 324—118 |
| 2,671,874 | 3/1954 | Friedrichs. | |
| 3,191,072 | 6/1965 | Magleby et al. | 307—88.5 |
| 3,193,771 | 7/1965 | Boatwright | 330—110 XR |
| 3,268,830 | 9/1966 | Ragsdale | 330—110 |
| 3,278,846 | 10/1966 | Patter et al. | 307—88.5 |

OTHER REFERENCES

Frye et al.: Random Sampling Oscillography; IEEE Trans. on Instrumentation and Measurement; March 1963; pp. 8–13.

McQueen: The Monitoring of High-Speed Waveforms, Electronic Engineering, October 1952, pp. 436–441.

Hewlett-Packard Company, Catalog No. 24, April 1963, p. 44.

RUDOLPH V. ROLINEC, *Primary Examiner.*

E. F. KARLSEN, *Assistant Examiner.*